UNITED STATES PATENT OFFICE.

ROBERT E. SCHMIDT AND PAUL TUST, OF ELBERFELD, GERMANY, ASSIGNORS TO FARBENFABRIKEN OF ELBERFELD CO., OF NEW YORK, N. Y.

ANTHRAQUINONE DYE AND PROCESS OF MAKING SAME.

SPECIFICATION forming part of Letters Patent No. 675,575, dated June 4, 1901.

Application filed January 3, 1901. Serial No. 41,939. (Specimens.)

*To all whom it may concern:*

Be it known that we, ROBERT E. SCHMIDT, doctor of philosophy, chemist, and PAUL TUST, chemist, (assignors to the FARBENFABRIKEN OF ELBERFELD COMPANY, of New York,) residing at Elberfeld, Germany, have invented a new and useful Improvement in New Anthraquinone Dyes; and we hereby declare the following to be a clear and exact description of our invention.

Our invention relates to the manufacture of new blue dyestuff sulfonic acids of the anthracene series from the two 1.4 amidoöxy-anthraquinone sulfonic acids, which can be obtained by treating the so-called alpha and beta nitroanthraquinone sulfonic acids (described by Claus, see *Berichte der Deutschen Chemischen Gesellschaft*, Vol. 15, p. 1519) with sulfursesquioxid, $(S_2O_3.)$ Our new process consists in treating the said sulfonic acids of 1.4 amidoöxyanthraquinone having the formula:

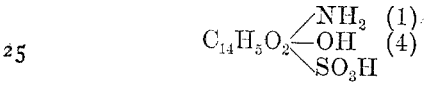

with primary aromatic amins—such as anilin, paratoluridin, xylidin, or the like—in the presence of condensing agents, such as boric acid or the like.

In this process the hydroxy group is replaced by an alphylamido radical, with the production of new dyestuff sulfonic acids having the following general formula:

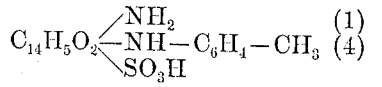

(R meaning in this formula an alphyl radical, such as phenyl, tolyl, xylyl, or the like.) The new dyestuff sulfonic acids thus obtained are in a dry state dark powders which are soluble in water and in ammonia with a blue color. They dye unmordanted and chrome-mordanted wool fast blue shades.

In carrying out our new process practically we can proceed as follows, the parts being by weight: Thirty parts of the above-mentioned alpha-sulfonic acid of 1.4 amidooxyanthraquinone having the above-given formula are mixed with three hundred parts of paratoluidin and ten parts of crystallized boric acid. This resulting mixture is heated to about from 150° to 160° centigrade until the color of the melt has turned from red to blue. After the reaction mass has been allowed to cool down to about from 60° to 70° centigrade it is poured into an excess of dilute hydrochloric acid, by means of which operation the condensation product separates in the shape of dark flakes. Subsequently it is filtered off and washed with water. In order to be purified, it is dissolved by hot water and precipitated again by the addition of common salt, filtered off, and dried.

When dry and pulverized, the new coloring-matter having in a free state the formula

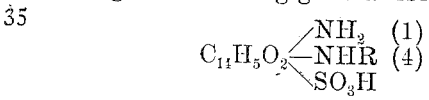

is a dark-blue powder, which is rather difficultly soluble in cold and more soluble in hot water with a blue color. It is easily soluble in ammonia, in ethyl alcohol, (of ninety per cent.,) and in acetic acid (of fifty per cent.) with a blue color. By the addition of hydrochloric acid to its watery solution the color of the latter turns redder, and by the addition of ammonia to this acid solution the original blue color is again produced. By concentrated sulfuric acid (of 66° Baumé) it is dissolved, yielding a violet solution the color of which changes into red on the addition of a small quantity of ice, while on adding a larger quantity of ice the dyestuff sulfonic acid is separated in the shape of a dark precipitate. It dyes unmordanted and chrome-mordanted wool blue shades fast to light and to alkalies.

Having now described our invention and in what manner the same is to be performed, what we claim as new, and desire to secure by Letters Patent, is—

1. The process for producing new dyestuffs of the anthracene series, which process consists in heating the herein-defined sulfonic acids of 1.4 amidoöxyanthraquinone with primary aromatic amins and then isolating the resulting dyestuff sulfonic acids from the reaction mixture, substantially as hereinbefore described.

2. The process for producing a new dyestuff of the anthracene series, which process consists in heating the alpha-sulfonic acid of 1.4 amidoöxyanthraquinone with paratoluidin, and then isolating the resulting dyestuff sulfonic acid from the reaction mixture, substantially as hereinbefore described.

3. The herein-described new dyestuff sulfonic acids of the anthracene series which, when dry and pulverized, are dark powders soluble in water and in ammonia with a blue color, dyeing unmordanted and chrome-mordanted wool fast blue shades, substantially as hereinbefore described.

4. The herein-described new dyestuff sulfonic acid, obtainable from the alpha-sulfonic acid of 1.4 amidoöxyanthraquinone and paratoluidin, which dyestuff is, when dry and pulverized, a dark-blue powder being rather difficultly soluble in cold and more soluble in hot water with a blue color, being easily soluble in ammonia, in ethyl alcohol (of ninety per cent.) and in acetic acid (of fifty per cent.) with a blue color, the color of its watery solution turning redder by the addition of hydrochloric acid and the original blue color being produced again by adding ammonia to the acid solution, being dissolved by concentrated sulfuric acid (of 66° Baumé) yielding a violet solution the color of which changes into red on the addition of a small quantity of ice, while on adding a larger quantity of ice the dyestuff sulfonic acid separates in the shape of a dark precipitate, dyeing unmordanted and chrome-mordanted wool blue shades fast to light and to alkalies, substantially as hereinbefore described.

In testimony whereof we have signed our names in the presence of two subscribing witnesses.

ROBERT E. SCHMIDT.
PAUL TUST.

Witnesses:
OTTO KÖNIG,
J. A. RITTERSHAUS.